United States Patent Office 3,284,343
Patented Nov. 8, 1966

3,284,343
REMOVAL OF SULFUR BODIES
William L. Shirley and Russell U. Smith, Houston, Tex., assignors to Petrolite Corporation, Wilmington, Del., a corporation of Delaware
No Drawing. Filed Mar. 6, 1964, Ser. No. 350,101
4 Claims. (Cl. 208—221)

This invention relates to a process of removing impurities such as sulfur bodies from hydrocarbon streams, and more particularly relates to the treatment of products of distillation such as petroleum fractions containing such impurities.

Hydrocarbons contaminated by the presence of even small proportions of sulfur-containing compounds have proven extremely difficult to handle in chemical processes occurring at elevated temperatures. For example, equipment used to conduct such high temperature processes undergoes rapid and severe corrosion and deterioration leading to high costs of maintenance and replacement. It is believed that in subjecting such hydrocarbons to increased temperatures these sulfur bodies act as, or decompose to form, acidic materials which foul and corrode the process equipment.

In addition, it is essential that hydrocarbons which are subjected to certain catalysts contain little, or be substantially free of, sulfur because the presence of sulfur in the hydrocarbon tends to deteriorate the catalyst. For example, desulfurization of hydrocarbon feedstocks is a necessary step in the manufacture of methanol from a mixture of carbon monoxide and hydrogen produced by steam reforming of a straight run naphtha. In this process of steam reforming it is essential that the naphtha contain little, or be substantially free from sulfur, because sulfur tends to rapidly deteriorate the catalyst used therein under normal commercial conditions.

In addition, when hydrocarbons such as naphtha are upgraded by treatment with certain catalysts such as platinum, palladium, etc., for example, in the preparation of a platformate gasoline, it is highly desirable to remove certain bodies, such as those containing sulfur, nitrogen, metals, etc., from the hydrocarbon stream since their presence therein tends to deteriorate or poison the catalyst.

In addition, the presence of sulfur bodies in fuels such as gasoline tends to diminish the effectiveness of tetraethyl lead in improving the octane number thereof.

Other disadvantages of having sulfur bodies in hydrocarbons are well known to those skilled in the art.

The impurities in hydrocarbon oils, such as for example those obtained by the fractional distillation of petroleum, can be reduced by treating with sulfuric acid. Such impurities include sulfur bodies, nitrogenous bodies, metals, unsaturated compounds, etc. When sulfuric acid treatment is completed and the acid is separated therefrom by any suitable means (such as by gravity, centrifugation, electrostatic treatment, etc.), the sulfuric acid-treated hydrocarbon is then treated with caustic to remove sulfuric acid and other residual acid bodies remaining in the hydrocarbon. After the aqueous caustic phase is separated from the hydrocarbon by any suitable means (gravity, centrifugation, electrostatics, etc.) the hydrocarbon is water washed to remove caustic and other residual water soluble impurities present in the oil and separation is thereupon effected by any suitable means, such as in the prior steps.

We have now discovered that although conventional sulfuric acid treatment is capable of removing various impurities, such as sulfur bodies, from hydrocarbon fluids the removal of such impurities can be enhanced by pretreating the hydrocarbon with caustic. For example, in one hydrocarbon stream, although the sulfur content of a sulfur-containing hydrocarbon was reduced to about 40% of its original value by the conventional sulfuric acid treatment, a corresponding process employing a caustic pretreatment (i.e. caustic treatment prior to treatment with sulfuric acid) reduced the sulfur content to less than 8% of its original value. Stated another way, caustic pretreatment in conjunction with the conventional sulfuric acid treatment enhanced sulfur removal by a factor of 5 as compared to sulfuric acid treatment without caustic pretreatment. Although the effectiveness of the conventional sulfuric acid process in removing sulfur will vary with the particular hydrocarbon stream, in general the use of a caustic pretreatment unexpectedly enhances the effectiveness of sulfur removal. This is the essence of the present invention.

Although we do not wish to be bound by theoretical considerations, it is believed that sulfuric acid treatment modifies some of the sulfur bodies so that they are neither acid nor caustic extractable. However, by employing caustic pretreatment many of these sulfuric bodies which are rendered non-extractable by acid treatment are removed from the hydrocarbon prior to acid treatment. In this way a higher percentage of sulfur bodies are removed from the hydrocarbon.

The following is a flow diagram of a preferred embodiment of the invention, wherein electrostatic separations are employed, which will be used to illustrate this invention.

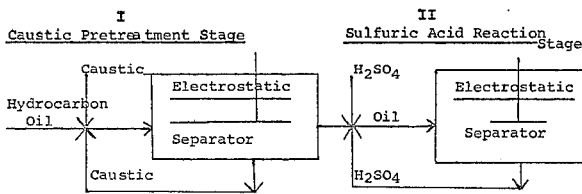
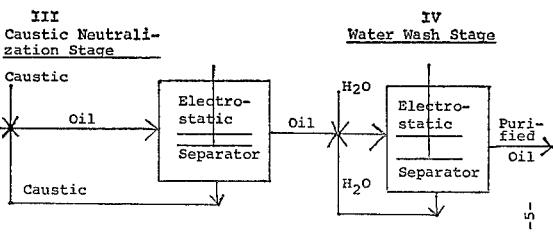

Although recycling of reagents in all stages is shown in the above diagram, it should be realized that recycling is optional. In addition, although electrostatic separators are shown and are preferred, separation may also be effected by gravity, centrifugation, combinations thereof or by any other suitable means. Furthermore, although the caustic neutralization Stage III and the water wash Stage IV are shown above, in some instances it may not be necessary to include these steps in the process.

Acid treatment of hydrocarbon streams in Stage II involves the use of strong mineral acids in concentrated form, such as sulfuric acid in the range of about 80% but preferably 88% to the oleums. In general we employ sulfuric acid having a titrable acidity of 85–98%. The amount of acid used is usually varied to suit the degree of refinement required for the particular oil stock being treated. After injecting the acid into the oil it is necessary to provide a mixing means which intensely emulsifies the acid and oil to form finely dispersed droplets of acid in the oil. By so doing, rapid reaction between the two phases is possible, and whatever chemical and/or physical solution changes are involved can quickly take place. In this way it is possible to mix the oil with the acid just prior to subjecting it to the electric treating field, thereby desirably minimizing the time of contact between the acid and the oil and obtaining superior oil quality as well as avoiding an aging effect on the sludge while in intimate contact with the oil. It has been found that extended oil-sludge contact tends to degrade the oil and to cause the sludge to become more viscous and of less economic value. If intense mixing is used in conventional settling processes, extended time periods are required to obtain any remotely satisfactory separations, thereby increasing the cost of the process in addition to degrading the products.

A satisfactory method of obtaining intense emulsification of the acid with the oil is to pass the preliminary mixture, obtained by continuously injecting the acid into the oil stream, through a motor-driven centrifugal pump which is throttled to increase the internal turbulence, or which is inverted so that the mixture is forced into its discharge and flows out through its suction. Such intense mixing permits rapid and efficient contact of the acid with the oil and is followed by the prompt action of the electric field in again separating the phases. Effluent acid from alkylation units may be employed to reduce operating costs.

In treatment of oils with the alkaline solution either in the pretreatment or in caustic neutralization treatment after sulfuric acid (i.e. Stages I and III) the alkali most commonly used is caustic soda, but other chemicals of equivalent chemical effect, such as caustic potash, etc. may be used. Thus, "alkali" as employed herein relates to caustic soda or its equivalent. In general, caustic solutions of almost any concentration may be employed provided a sufficient volume thereof is employed to effect the desired results.

In the case of the caustic neutralization Stage III of the process, caustic of almost any concentration may be used. Therefore, the refinery operator usually chooses whatever strength is easily available with preference generally going to the lower concentrations, for example 1% by weight or greater, such as 5–20% by weight. Higher concentrations can be used, if desired. In the case of the caustic pretreatment Stage I, stronger concentrations of caustic are generally preferred, for example concentrations of about 10–50% by weight or higher since these higher concentrations are, in general, more effective in removing those sulfur bodies which are rendered non-extractable by sulfuric acid treatment. In practice we generally employ concentrations of about 20–30% by weight of caustic.

Although the above concentrations are most effective, other concentrations lower or higher are also advantageously employed. Since the amount of caustic employed in Stages I and III is in essence a matter of stoichiometry in employing sufficient caustic to remove the acid bodies therefrom, the total amount necessary can be calculated from an analysis of the oil in each case. Furthermore, since caustic is generally recycled, an excess of caustic is generally employed in each pass with sufficient caustic being added to maintain the caustic concentration at an optimum value. Stated another way, the minimum amount of caustic employed is determined by the stoichiometry of the system and the maximum amount by economical considerations. The optimum amount of caustic can be determined for each hydrocarbon.

In order to obtain the most efficient use of the alkaline solutions in reacting with the oil constituents, it is necessary that intimate contact be made between the two phases. However, the mixing of the alkaline systems can usually not be so violent as the acid mixtures described above, because of the possible formation of extremely tight emulsions which are not amenable to treatment by the electric fields. We have found that intimate contact is obtainable without adverse effects if the alkaline solution is sprayed into the flowing oil stream by means of a distributor providing a narrow opening of considerable length, as by the injector apparatus to be described. Centrifugal pumps may cause treating difficulties and are therefore not generally desirable. Due to the high coalescing effectiveness of electrical treatment, intimate contact between the alkali and oil can be utilized, such as by an injector means, thereby making it possible to use only the amount of caustic required to complete reaction with the desired oil constituents. Adequate emulsification may also be obtained by the use of multiple baffle mixers. Because of the rapid treatment possible with electrical treatment, aging effects due to extensive or prolonged contact between the phases are prevented.

When emulsions of acid or alkali with the oil have been properly prepared as described above, they are promptly introduced into an electric treater, being therein subjected to electrostatic treatment. Suitable examples of electric treaters suitable in this invention are described in U.S. Patents 2,855,357, 2,855,360, 2,976,228, etc. and in U.S. applications S.N. 64,574, now abandoned, 174,065, now U.S. Patent No. 3,232,860; 175,688, now U.S. Patent No. 3,205,161; 230,978, now U.S. Patent No. 3,205,160, and elsewhere. Other types of treaters are well known to the art. In practice we prefer to employ an electric treater of the "cellular" type such as described in application S.N. 175,688 and employing from about 10 to 40 kv., for example about 15 to 30 kv., but preferably about 19 to 23 kv.

Aqueous washes are carried out in the conventional manner, preferably followed by electrostatic treatment.

The following examples are presented for purposes of illustration and not of limitation.

*Examples*

A raw sulfur-containing virgin 80° API naphtha was (1) treated with concentrated sulfuric acid (5 lb. $H_2SO_4$/ barrel of naphtha) and then electrically treated to separate the acid therefrom; (2) treated with 10 wt. percent of recycle aqueous caustic (2 pounds of caustic solution/ barrel of naphtha), electrically treated to separate the caustic therefrom; and (3) water washed and then electrically treated to separate the water therefrom. The sulfur content of the resulting product was reduced to about 40% of its original value.

The above example was repeated except that the raw naphtha was contacted with 20% by weight of aqueous caustic (4 pounds/bbl.) prior to treatment with sulfuric acid (i.e. caustic pretreatment). The sulfur content of the resulting hydrocarbon was reduced to less than 8% of its original value.

The above example, when repeated employing various sulfur-containing (for example 25–1500 p.p.m.) hydrocarbons, particularly petroleum distillates such as naphthas having ASTM boiling ranges of approximately 70°–450° F., produce similar results. The naphthas employed include Mid-Continent (Types I, II and III), Arabian, North Texas, South Louisiana, etc. In all cases the caustic pretreatment enhanced the removal of sulfur from the hydrocarbon. We generally employ from about 1–25 lbs. but preferably about 2–10 lbs. of concentrated $H_2SO_4$/bbl. of petroleum or more; and in the case of aqueous caustic in the pretreatment we generally employ 20–30 vol. percent of aqueous caustic, using from about 1 to 10 lbs. or more of caustic (calculated as free NaOH)/barrel of oil containing about 0.1% of sulfur bodies calculated as phenylmercaptan (RSH). Lesser or greater amounts can be employed with other mercaptan concentrations.

In addition to sulfur bodies, nitrogen bodies and metal bodies such as arsenic, lead, etc. were substantially reduced or removed.

The temperatures employed in all stages is ambient but higher temperatures such as from 40–150° F. may be employed. However, with sulfuric acid the use of temperatures above 150° F. tends to form undesirable by-products as esters, sulfones, etc.

In application S.N. 337,128, which is by reference incorporated in the present application, there is disclosed the use of amines in removing certain sulfur bodies, such as sulfonic acid anhydrides, which are formed in the hydrocarbon when it is treated with sulfuric acid. These sulfonic acid anhydrides cannot be removed by treatment with sulfuric acid, caustic or water. In S.N. 337,128 there is disclosed a process of removing such sulfonic acid anhydrides by treating petroleum with amines. In the preferred embodiment of S.N. 337,128 the amine is dissolved in the caustic solution and this amine-caustic solution is employed to treat the hydrocarbon after sulfuric acid treatment. In the present invention, the amine can also be incorporated into the caustic solution or can be employed separately, such as for example prior to treatment with the caustic employed after sulfuric acid treatment.

The following specific amines when employed yield satisfactory results: ethylene diamine, 2-aminoethanol, sulfamic acid generally employed as 10% w./v. of amine in aqueous caustic.

In addition, any of the other amines disclosed in S.N. 337,128 which are capable of reacting with a sulfonic anhydride so as to yield a product which is capable of aqueous extraction from the hydrocarbon can be employed.

Amines were satisfactorily employed in the present invention by using 10% w./v. sulfamic acid in the caustic neutralization wash (Stage III) as well as by washing with 10% sulfamic acid solution and electrically treating prior to the caustic wash of Stage III.

Hydrocarbon products obtained by treatment according to this invention exhibit little, if any, fouling and corrosion in distillation, minimize sulfur poisoning in sensitive catalysts such as platinum, palladium, etc., yield products which are superior as fuels to the untreated hydrocarbon since they contain little, if any, sulfur.

In summary, the present invention relates to a caustic pretreatment of hydrocarbon stocks, particularly of the naphtha type, where such stocks are then treated with sulfuric acid to remove sulfur and other impurities therefrom. In the preferred embodiment, hydrocarbons pretreated with caustic and then treated with sulfuric acid are then neutralized with caustic and followed by a water wash. Although any suitable type of separation can be employed after each stage, electrostatic separation is preferred. The present invention may be employed in conjunction with any of the conventional desulfurization processes employing sulfuric acid.

While the invention has been described herein with particular reference to various preferred embodiments thereof, it will be appreciated that variations from the details given herein can be effected without departing from the invention in its broadest aspects.

Having thus described our invention what we claim as new and desire to obtain by Letters Patent is:

1. The process of removing sulfur bodies from a hydrocarbon consisting essentially of (1) treating said hydrocarbon with a solution of caustic alone, (2) separating said caustic from said so-treated hydrocarbon, (3) treating said caustic treated hydrocarbon with sulfuric acid having a titrable acidity of about 80% to about 98%, (4) separating said sulfuric acid from said so-treated hydrocarbon, (5) treating said caustic and sulfuric acid treated hydrocarbon with a solution of caustic alone, and (6) separating said caustic from said so-treated hydrocarbon.

2. The process of claim 1 wherein each of the separation steps (2), (4) and (6) is effected electrostatically.

3. The process of removing sulfur bodies from a hydrocarbon consisting essentially of (1) treating said hydrocarbon with a solution of caustic alone, (2) separating said caustic from said so-treated hydrocarbon, (3) treating said caustic treated hydrocarbon with sulfuric acid having a titrable acidity of about 80% to about 98%, (4) separating said sulfuric acid from said so-treated hydrocarbon, (5) treating said caustic and sulfuric acid treated hydrocarbon with a solution of caustic alone, (6) separating said caustic from said so-treated hydrocarbon, (7) subjecting said caustic, sulfuric acid and caustic treated hydrocarbon to a water wash and (8) separating said water from said so-treated hydrocarbon.

4. The process of claim 3 wherein each of the separation steps (2), (4), (6) and (8) is effected electrostatically.

References Cited by the Examiner

UNITED STATES PATENTS 2,980,606  4/1961  Van Beest et al. _____ 208—224

FOREIGN PATENTS 1,016,302  11/1952  France.

OTHER REFERENCES

Kalichevsky et al., Petroleum Refining with Chemicals, N.Y., Elsevier Pub. Co., 1956, pages 136–183, p. 144 needed.

DELBERT E. GANTZ, *Primary Examiner.*

S. P. JONES, *Assistant Examiner.*